United States Patent [19]
Serbin et al.

[11] Patent Number: 5,753,171
[45] Date of Patent: May 19, 1998

[54] METHOD AND APPARATUS FOR PRODUCING A THREE-DIMENSIONAL OBJECT

[75] Inventors: Jürgen Serbin, Gräfelfing; Johannes Reichle, München; Hans J. Langer, Gräfelfing, all of Germany

[73] Assignee: EOS GmbH Electro Optical Systems, Planegg, Germany

[21] Appl. No.: 727,532

[22] PCT Filed: May 9, 1995

[86] PCT No.: PCT/EP95/01742

§ 371 Date: Oct. 23, 1996

§ 102(e) Date: Oct. 23, 1996

[87] PCT Pub. No.: WO95/31326

PCT Pub. Date: Nov. 23, 1995

[30] Foreign Application Priority Data

May 13, 1994 [DE] Germany ............... 44 16 901.9
May 13, 1994 [DE] Germany ............... 44 16 988.4

[51] Int. Cl.⁶ ............... B29C 35/08; B29C 41/02
[52] U.S. Cl. ............... 264/401; 250/492.1; 250/503.1; 250/504 R; 250/505.1; 264/40.1; 264/308; 264/497; 356/121; 359/223; 359/264; 425/135; 425/174.4
[58] Field of Search ............... 264/40.1, 308, 264/401, 497; 425/135, 174.4; 250/492.1, 503.1, 504 R, 505.1; 356/121; 359/223, 264

[56] References Cited

U.S. PATENT DOCUMENTS 5,014,207  5/1991  Lawton ............... 364/468.27
5,151,813  9/1992  Yamamoto et al. ............... 359/202

FOREIGN PATENT DOCUMENTS

| | | |
|---|---|---|
| 171 069 | 2/1986 | European Pat. Off. . |
| 375 097 | 6/1990 | European Pat. Off. . |
| 406 513 | 1/1991 | European Pat. Off. . |
| 287 657 | 12/1994 | European Pat. Off. . |
| 2-95830 | 4/1990 | Japan . |
| 2 262 817 | 6/1993 | United Kingdom . |
| WO 88/02677 | 4/1988 | WIPO . |
| WO 89/11085 | 11/1989 | WIPO . |
| WO 91/12510 | 8/1991 | WIPO . |

OTHER PUBLICATIONS

Lexikon der Optik, H. Haferkorn, Leipzig, 1988, pp. 210, 291 (No Translation).

Systems and Computers in Japan, vol. 20, No. 3, Mar. 1989, pp. 58–66, XP 000071510, Takashi Nakai, et al., "Fabrication of Three–Dimensional Objects Using Laser Lithography", translated from Denshi John Tsushin Gakkai Ronbunshi, vol. 71–D, No. 2, Feb. 1988 pp. 416–423.

Patent Abstracts of Japan, M–991, 1990, vol. 14, No. 300, JP 2-95829.

*Primary Examiner*—Leo B. Tentoni
*Attorney, Agent, or Firm*—George W. Neuner

[57] ABSTRACT

When producing an object by subsequent solidification of material layers 1 at places corresponding to the object there is a problem of limited production speed because the scanning speed or laser power of the light beam scanning the material layer 1 cannot be increased at will, if the light beam 4 used for solidification is focused as required for exact resolution. According to the invention this problem is solved by providing a variable focusing device 8 in the light beam 4, whereby the focus of the light beam 4 can be varied during the solidification of the layer 1. Thus, a different focus, laser power and scanning speed can be used in different regions of the layer 1.

44 Claims, 2 Drawing Sheets

METHOD AND APPARATUS FOR PRODUCING A THREE-DIMENSIONAL OBJECT

FIELD OF THE INVENTION

The invention relates to methods and apparatus for producing a three-dimensional object by applying subsequent layers of a material that can be solidified by electromagnet radiation and irradiating a focussed beam to places corresponding to the object.

BACKGROUND OF THE INVENTION

An apparatus and a method of this kind is known as stereolithography and can be carried out, as described for example in EP-A-0 171 069, by layerwise solidification of a liquid, photopolymerizeable material using a focused laser beam. This method can also be carried out by sintering powder using the laser beam (see EP-A-0 287 657). In all such cases there is the problem that it is not possible to increase arbitrarily the production speed because a scan speed of the laser beam which depends on the type of the laser and on the material to be solidified cannot be exceeded with a predetermined focusing degree of the laser beam. Furthermore, a possible disadjustment of the laser beam cannot be detected (see EP-A-0 287 657). In all cases one faces the problem that a disadjustment of the beam or deterioration of the beam quality occurs due to shocks, aging of the laser or other effects and therefore the manufacturing quality is deteriorated.

WO 88/02677 discloses a method and apparatus for producing a three-dimensional object by applying subsequent layers of a material that can be solidified by electromagnet radiation and irradiating a focussed beam to places corresponding to the object.

The EP 0 375 097 A2 discloses an apparatus comprising a light source with deflection mirrors and a single position detector which is moved automatically to grid points of a working surface. At the respective grid points the instructions to the deflection mirrors necessary to direct the beam of the light source to the grid points are stored. This enables a calibration of the deflection mirrors. There is further known a stereolithographic apparatus comprising a resin tank which has two sensors for sensing the intensity profile of the beam mounted laterally of the resin tank.

It is therefore the object of the invention to improve the speed and the accuracy of the production of the object and to guarantee a constant quality in the production of the object. Furthermore, an efficient operation even using pulsated lasers should be possible.

SUMMARY OF THE INVENTION

In accord with the present invention, the above object is achieved by a method and apparatus for producing a three-dimensional object by applying subsequent layers of a material that can be solidified by electromagnet radiation and irradiating a focussed beam to places corresponding to the three-dimensional object.

According to the invention the beam used for solidification is measured preferably at a plurality of points of the layer as close as possible to the surface of the material layer, i.e. immediately before striking the material, and compared with reference data. This makes it possible to detect, indicate and, if necessary, correct a possible dusting or disadjustment of the optical system, a defect of the optical or electronical components for adjusting the beam or a beam change due to aging effects.

According to the invention the focusing of the beam used for solidification can be changed and measured so that the best focusing degree and alignment of the beam regarding production speed and accuracy can be adjusted according to the region of the layers to be solidified, the type of the laser and the material. Furthermore, a possible dusting or disadjustment of the optical system, a defect of the optical or electronic components for adjusting the beam and a change of the beam due to aging effects can be detected, indicated and corrected, if necessary. Embodiments of the invention will now be described with reference to the figures. In the figures:

DETAILED DESCRIPTION OF THE INVENTION

Figure 1:
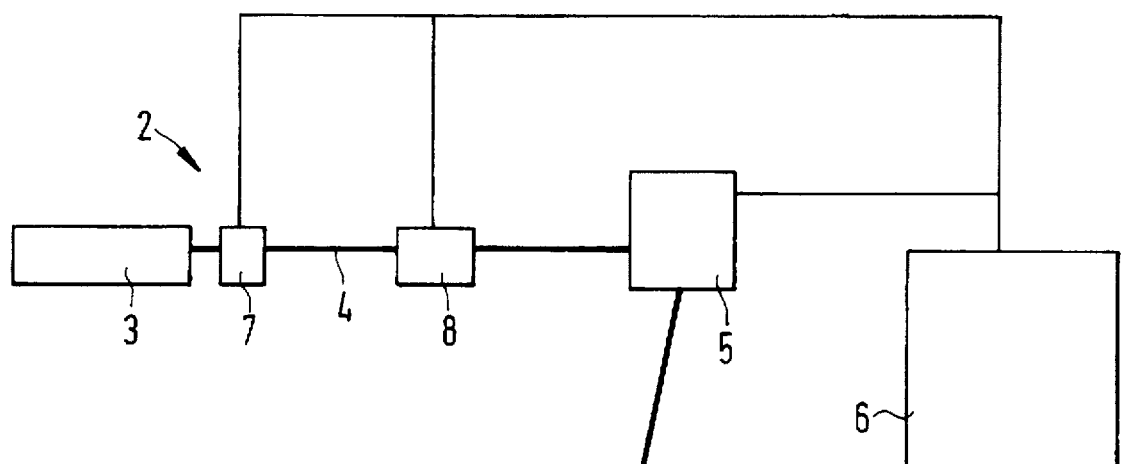
FIG. 1 is a schematical representation of the inventive apparatus.
Figure 1:
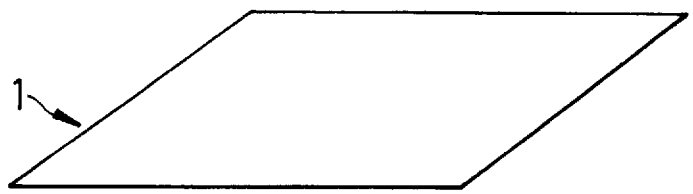

The representation of the inventive apparatus in FIG. 1 shows a layer 1 of a material which can be solidified using electromagnetic radiation, for example a polymerizeable liquid or paste or a sinterable powder material, as well as a solidifying device 2 arranged above the layer for solidifying the material of the layer 1 at the places corresponding to the object to be produced. The solidifying device 2 comprises a radiation source 3 formed as a laser and directing a focused light beam 4 to a deflection device 5 operable to deflect the light beam 4 to the desired places of the layer 1. To this end the deflection device is connected to a control unit 6 for corresponding control of the deflection device 5.

Between the light source 3 and the deflection device 5 there are subsequentially arranged in the light beam 4 a modulator 7 and a variable focusing device 8 which are also connected to the control unit 6 for control in the manner described further below. The modulator may for example be formed as an acousto-optical, electro-optical or mechanical modulator and serves as "switch" for pulsing or interrupting, respectively, the beam 4.

Figure 2:
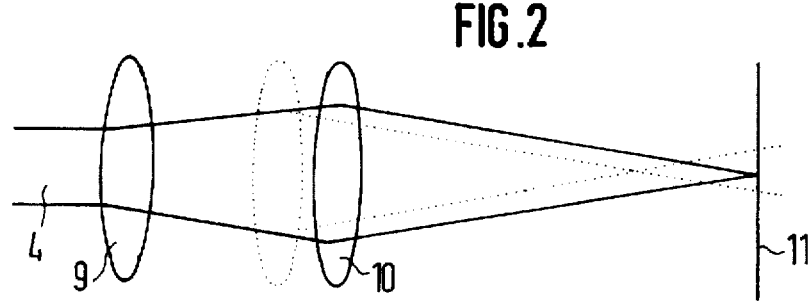
FIG. 2 shows the concept of changing the beam focus.

The variable focusing device 8 serves to change the focus of the beam 4. As shown in more detail in FIG. 2 it comprises to this end a concave dispersing lens 9 and a convex focusing lens 10 following each other in direction of the beam 4. The focusing lens 10 may for example be positioned in direction of the beam 4 between the position shown in dotted lines and the position shown in full lines in FIG. 2 and varies the focus and therefore the diameter of the beam at the working or reference plane 11, which may for example be the surface of the layer 1, according to its position. The displacement of the focusing lens 10 is made by a (not shown) displacement device using a step motor or servo motor connected to the control unit 6. The arrangement of the two lenses 9, 10 may be replaced by any other suitable multiple lens arrangement with a focus variation by displacing two lenses relative to each other. Instead of using the variable focusing device 8 the deflection device 5 may comprise deflection mirrors having an adjustable variable radius of curvature. In this case the focus of the beam 4 can be varied by changing the radius of curvature of the deflection mirrors.

Figure 4:
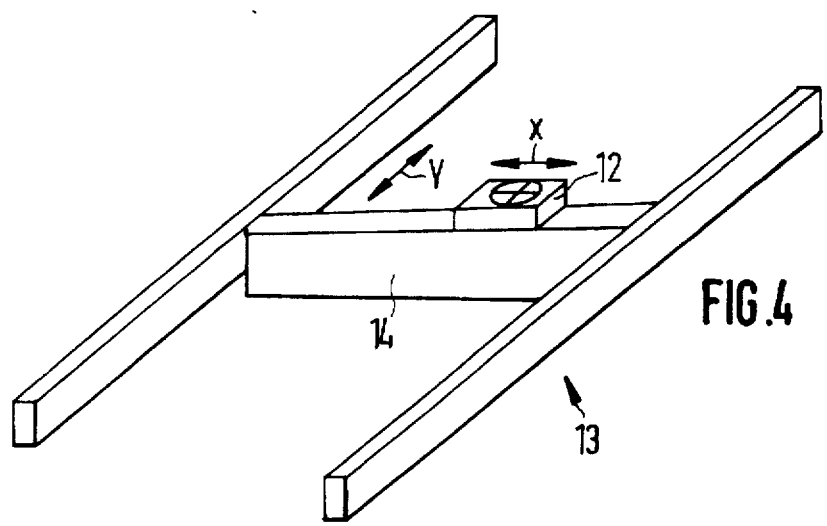
FIG. 4 is a perspective and schematical representation of a positioning device for an inventive sensor.

Between the deflection device 5 and the layer 1 there is further arranged a sensor 12 which can be moved to each place above the layer 1 in a plane parallel thereto, and preferably immediately above the layer 1 using the positioning device 13 shown in more detail in FIG. 4. The positioning device 13 is formed as an X, Y positioning device whereby the sensor 12 is displaceable in a first X direction along the upper side of a wiper 14 extending across the layer 1 in X direction and being movable across the layer 1 in Y direction for adjusting a desired layer thickness of the material. In another embodiment the sensor may also be positioned independently of the wiper. The sensor output is connected to the control unit 6.

Figure 5:
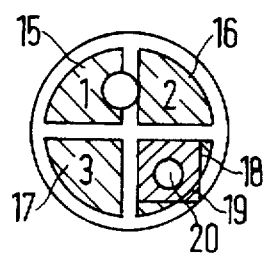
FIG. 5 shows a first embodiment of the sensor.

A first embodiment of the sensor 12 is shown in FIG. 5. The sensor 12 according to FIG. 5 is formed as a quadrant sensor having a light sensitive member formed as a photodiode 15, 16, 17, 18 disposed in each quadrant. The photodiode 18 of one quadrant is covered by an opaque cover, for example a small metal plate 19, having a diaphragm aperture 20 in the center thereof. According to a second embodiment shown in FIG. 6 the sensor 12 is formed as a single sensor having a single field with a light sensitive member formed as a photodiode 21 disposed therein, whereby the photodiode is again covered by an opague cover, for example a small metal plate, with the exception of a central diaphragm aperture. The diameter of the diaphragm aperture 20, 23 is between about 20 μm and 50 μm, preferably 35 μm.

In operation the laser beam 4 is first measured with regard to its position, power and diameter. The position detection is made using the sensor 12 shown in FIG. 5 by positioning the sensor 12 at a predetermined defined X, Y location and using the control unit 6 to control the deflection device 5 so that the deflected beam 4 passes over the sensor 12 and travels from the field of the photodiode 15 to that of the photodiode 16. The output signals of both photodiodes are compared; if both signals are equal the position of the beam 4 exactly corresponds to the transition between both fields of the photodiodes and thus to the central position of the sensor 12. A corresponding measurement is made for the transition from the photodiode 15 to the photodiode 17. By comparing the positional data obtained with the corresponding desired position of the deflection means 5 it is determined whether the adjustment of the beam 4 is correct or a disadjustment exists. In the latter case the control in the control unit 6 is corrected or a readjustment of the apparatus is made. The positional measurement is carried out by moving the sensor 12 to various positions above the layer surface 1 corresponding to arbitrary places within the area of irradiation using the positioning device 13 so that the positioning accuracy at the solidifying device 2 can be exactly determined. However, it is also possible to measure only at selected points, for example at two points, to detect a global drift for example caused by a temperature variation. This drift can then be compensated again by corresponding correction of the control unit 6 or of the control software stored therein, respectively.

The power of the beam 4 can be determined by direct processing of the output signals of the photodiodes 15, 16 and 17 with the amplitude thereof corresponding to the power. Also pyroelements may be used of this purpose. By comparison with nominal values again a defect of the solidifying device 2 can be detected, for example, dusting of the optical system, aging or even failure of optical or electronic components.

Figure 6:
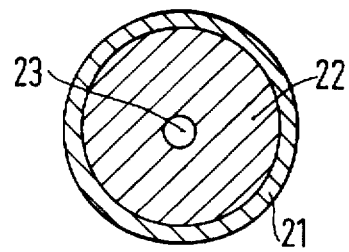
FIG. 6 shows a second embodiment of the sensor.

For the purpose of measuring the diameter of focus of the beam 4 the deflection device 5 and/or the positioning device 13 is controlled so that the deflected beam 4 passes over the diaphragm aperture 20 of the sensor according to FIG. 5 or over the diaphragm aperture 23 of the sensor according to FIG. 6 along two coordinate directions. Thus, the intensity profile of the beam 4 is scanned and the focus or diameter of the beam 4 is calculated using the obtained intensity data of the profile. This measurement can be made in the entire irradiation area or at selected points only, for example in connection with the power measurement. Again, a deviation caused for example by aging of the laser or a disadjustment of the optical system can be detected by comparison with corresponding nominal values. In this case, a certain correction can be made by varying the focus by means of control of the variable focusing device 8.

When using the sensor 12 shown in FIG. 6 the position and power of the beam 4 is determined with the aid of calculations, i.e. the position as calculated by determining the intensity maximum and the power is calculated by integration of the profile. Such calculations are known and are therefore not explained in detail.

Figure 3:
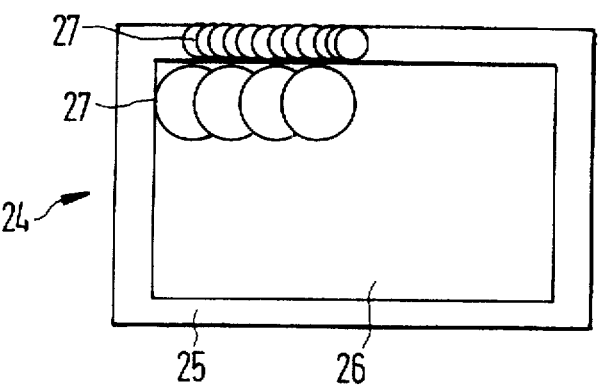
FIG. 3 shows the varying focus of the beam according to the solidified region, preferably, when using a pulsated laser.

After adjusting and measuring the beam 4 a material layer 1 is applied and solidified by concerted irradiation of the layer 1 at the places corresponding to the object using the deflected beam 4. FIG. 3 shows a region 24 which includes, as an example, the places to be solidified of the layer. For solidification this region is divided into an outer envelope region 25 and an inner core region 26, whereby the envelope region 25, preferably completely, encloses the core region 26. For solidification the control unit 6 controls the variable focusing device 8, the deflection device 5 and the laser 3 in such a manner that the layer is irradiated with a smaller beam diameter or focus indicated by the small circles in the envelope region 25 and with a larger beam diameter or focus, as indicated by the larger circles, in the core region 26. This results in a finer and more accurate solidification of the material in the envelope region 25 forming the surface or contour of the object. According to a preferred development the deflection device 5 is controlled so that the speed of the deflected beam 4 passing over the layer 1 (i.e. the scanning speed) is higher in the core region than in the envelope region 5, whereby the production time is considerably reduced. This measure is particularly useful in connection with a high power of the laser 3, because the power density even with a larger beam diameter or focus is then still sufficient for solidification even at higher scanning speeds. When using a power-adjustable light source for this case the power for solidifying the envelope region 25 can be reduced to adjust the energy or power density to a value suitable for solidification.

The above-described method is particularly preferred in connection with a pulsed laser used as radiation source 3. Usually, the pulse rate of such lasers is too low to obtain high scanning speeds with a small focus. Rather, only single spaced places are solidified in this case. On the other hand, the average power of this laser decreases above a certain pulse rate. Further, the pulse duration, of for example frequency multiplied solid-state lasers is very short (about 30 ns). The energy or power density input into the material can no longer be adjusted by varying the scanning speed but only by controlling the attenuation, the repetition rate of the laser and/or the beam diameter. According to the invention it has been found that an operation with best efficiency is obtained by adjusting the beam diameter. An optimum repetition rate in connection with a maximum scanning speed then results from the predetermined value of the beam diameter. At a lower scanning speed the energy input and accordingly the overlap of the places can be increased.

According to the invention a short production time in combination with a high structural resolution is obtained for pulsed lasers by solidifying using a smaller focus in the envelope region 25 and a larger focus in the core region 26 and correspondingly adjusting the scanning speed and the repetition rate so that in both regions the areas 27 solidified with each pulse overlap and thereby form a continuous line. This is shown in FIG. 3: Since the admissible scanning speed is proportional to the diameter of the beam or focus 27 which is shown as circle in FIG. 3, the scanning speed in the core region 26 can be increased with respect to that of the envelope region 25 by the factor defining the increase of the diameter in the core region. Moreover, correspondingly less scanning lines are required in the core region 26. Thus, the production time decreases with the square of the relative diameter increase. In both regions 25, 26 the repetition rate and the beam focus and therefore the average power of the laser results from the corresponding scanning speed which gives a small average power in the envelope region 25 and a larger average power in the core region 26.

For adjusting the focus the control unit 6 varies the position of the focussing lens 10 relative to the dispersing lens 9 by axial displacement dependent upon whether the deflection device 5 directs the beam 4 to the core region 26 or to the envelope region 25. The corresponding control data are stored in the control unit 6. Preferably, the envelope region 25 is first solidified using a small focus and thereafter the focus is increased and the core region 26 is solidified with the focus being once adjusted to this increased value. Again, the focus adjustment of the beam can be measured and corrected using the sensor 12 in the above-explained manner.

The further layers of the object are applied and solidified in the same manner.

The beam can be measured as described above before producing an object but also between the solidification of individual layers or at larger intervals, for example day by day.

Detected deviations from admissible values can also be displayed on a display device.

Preferably, diode pulsed neodym YAG laser or diode pulse neodym YLF laser having a power of about 300 mW are used as solid-state lasers.

We claim:

1. A method for producing a three-dimensional object using a material which is solidified under the action of electromagnetic radiation, said method comprising the following steps:
    a) producing a layer of said material;
    b) irradiating said layer with a beam of electromagnetic radiation at places corresponding to said object;
    c) varying a focus of said beam during said irradiation as a function of the solidifying place of said layer; and
    d) solidifying subsequent layers of said object according to above steps a) to c) to produce said three-dimensional object.

2. The method of claim 1, comprising using a smaller focus in a first region of said layer corresponding to a boundary region of said object and a larger focus for irradiating a core region of said object.

3. The method of claim 1, comprising varying said focus as a function of an irradiation power of said beam.

4. The method of claim 1, comprising varying said focus as a function of a scanning speed of said beam.

5. The method of claim 1, comprising producing said beam with a pulsed radiation source and adjusting said focus as a function of a pulse energy of said pulsed beam.

6. The method of claim 1, whereby a beam having a small focus and a low traveling speed is used for solidifying a first region and a beam having a larger focus and a higher speed is used for solidifying a second region.

7. The method of claim 6, comprising increasing a beam power in said second region.

8. The method of claim 5, comprising providing an average beam power of said pulsed radiation source in a first region and increasing the average beam power of said pulsed radiation source in a second region.

9. The method of claim 1, comprising measuring a position, a power and/or a focus diameter of the said beam at a position above said layer of said material.

10. The method of claim 9, comprising varying said focus as a function of the result obtained by said measuring step.

11. The method of claim 1, comprising using a solid-state laser for producing said electromagnetic radiation.

12. Methods for producing a three-dimensional object using a material which is solidified under the action of electromagnetic radiation, said method comprising the following steps:
    a) producing a layer of said material;
    b) irradiating said layer with a beam of electromagnetic radiation at places corresponding to said object;
    c) solidifying subsequent layers of said object according to above steps a) and b), and
    d) measuring a position, a power and/or a diameter of said beam at a location above said layer to produce said three-dimensional object.

13. The method of claim 12, comprising comparing the result of said measurement with predetermined reference values and indicating an error and/or correcting said beam on the basis of said comparison.

14. The method of claim 12, comprising measuring said beam at a plurality of locations above said layer.

15. The method of claim 12, comprising using a solid-state laser for producing said electromagnetic radiation.

16. Apparatus for producing a three-dimensional object by subsequent solidification of layers of a material under the action of electromagnetic radiation, said apparatus comprising means for producing a layer of said material;
    means for producing a focused beam of electromagnetic radiation;
    means for deflecting said focused beam onto said layer; and sensor means for measuring said focused beam, said sensor means being arranged between said deflection means and said layer.

17. The apparatus of claim 16, comprising a sensor for measuring said beam, said sensor being arranged between said deflection means and said layer.

18. The apparatus of claim 17, wherein said sensor is connected with a positioning device for positioning said sensor at a plurality of places within a plane parallel to said layer.

19. The apparatus of claim 18, wherein said positioning device is formed as a XY positioning device.

20. The apparatus of claim 19, comprising wiper means extending in a first X direction across said layer, means for displacing said wiper means in a second Y direction across said layer, and means for moving said sensor in said first X direction at said wiper means.

21. The apparatus of claim 16, wherein said sensor is designed for measuring a position, a power and/or a diameter of said focused beam.

22. The apparatus of claim 16, wherein said sensor is designed as a quadrant detector having at least three detector sectors.

23. The apparatus of claim 16, wherein said sensor comprises a single detector having a radiation sensitive detector surface, and radiation opaque means for covering said detector surface with the exception of a diaphragm aperture.

24. The apparatus of claim 23, wherein said single detector is arranged in a quadrant of a quadrant detector.

25. The apparatus of claim 18, further comprising a control unit, wherein said sensor and said positioning device are connected to said control unit.

26. The apparatus of claim 16, wherein said means for producing a focused beam comprises a solid state laser.

27. The apparatus of claim 26, comprising means for varying a focus of said beam of said electromagnetic radiation.

28. The apparatus of claim 26, comprising a neodym YAG laser or a neodym YLF laser.

29. The apparatus of claim 27, wherein said means for varying said focus is disposed between said radiation source and said deflecting means.

30. The apparatus of claim 27, wherein said means for varying said focus comprises two lenses, one of said lenses being displaceable in axial direction of said beam relative to the other of said lenses.

31. The apparatus of claim 27, comprising a modulator disposed in said focused beam, said modulator being controlled for interrupting or passing said focused beam.

32. The apparatus of claim 31, wherein said means for varying said focus, said deflecting means and said modulator are connected with a control unit for varying said focus of said beam as a function of said beam deflection.

33. The apparatus of claim 26, comprising a sensor for measuring said beam, said sensor being arranged between said deflection means and said layer.

34. The apparatus of claim 33, wherein said sensor is connected to a positioning device for positioning said sensor at a plurality of places in a plane parallel to said layer.

35. The apparatus of claim 34, wherein said positioning device is formed as a XY positioning device.

36. The apparatus of claim 34, comprising wiper means extending in a first X direction across said layer and means for displacing said wiper means in a second Y direction across said layer, and means for displacing said sensor in said first X direction at said wiper means.

37. The apparatus of claim 34, wherein said sensor is designed for measuring a position, a power and/or a diameter of said focused beam.

38. The apparatus of claim 34, wherein said sensor is formed as a quadrant detector having at least three detector sectors.

39. The apparatus of claim 34, wherein said sensor comprises a single detector having a radiation sensitive detector surface and an opaque cover for covering said detector surface with the exception of a diaphragm opening.

40. The apparatus of claim 39, wherein said single detector is arranged in a quadrant of a quadrant detector.

41. The apparatus of claim 34, further comprising a control unit, wherein said sensor and said positioning device are connected to said control unit.

42. The method of claim 9, wherein said measuring is performed immediately above said layer.

43. The method of claim 42, comprising varying said focus as a function of the result obtained by said measuring step.

44. The method of claim 12, wherein said measuring is performed immediately above said layer.

* * * * *